W. K. EVANS.
Seeding-Machine.
No. 208,469. Patented Oct. 1, 1878.
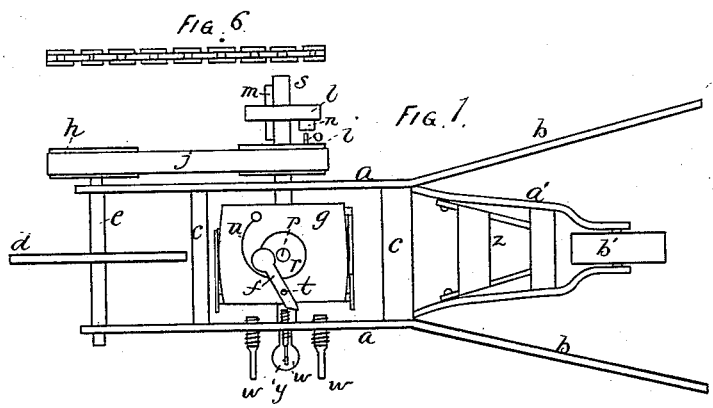
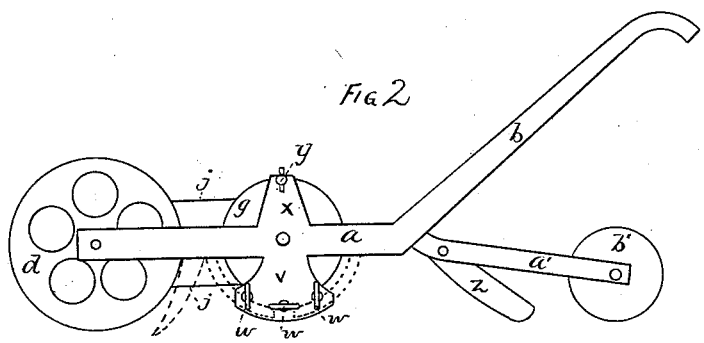
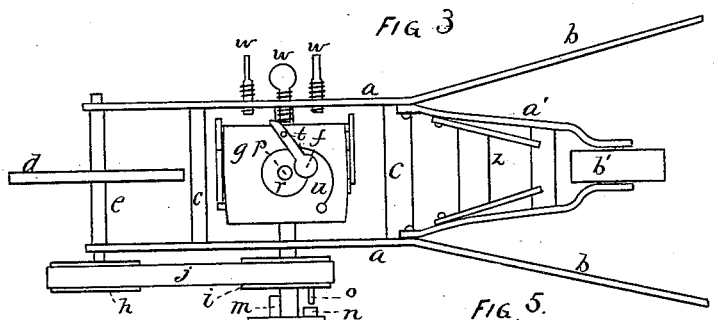
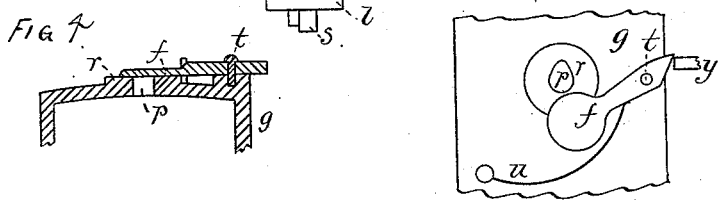
WITNESSES.
Samuel D. Kelley.
George B. Haskell.
INVENTOR.
William K. Evans
By Porter & Hutchinson Attys

UNITED STATES PATENT OFFICE.

WILLIAM K. EVANS, OF BERKELEY, MASSACHUSETTS.

IMPROVEMENT IN SEEDING-MACHINES.

Specification forming part of Letters Patent No. 208,469, dated October 1, 1878; application filed April 27, 1878.

*To all whom it may concern:*

Be it known that I, W. K. EVANS, of Berkeley, State of Massachusetts, have invented Improvements in Seeding-Machines, of which the following is a specification:

This invention relates to certain improvements in that class of seeding or seed-planting machines which are designed to deposit the seed at regular distances in a drill or furrow formed either simultaneously with such deposit of the seed, and by the seeding-machine, or independently and previous to such seeding, by another machine; and the invention consists in a hollow rotary seed receptacle or carrier, which is pivoted at its center, and is combined and arranged relatively to the other constituent parts of the seeder, so as to be automatically rotated through and by the rotative motion produced by the contact of the pilot-wheel with the earth as the seeder is impelled forward, such rotary seed-carrier being formed and provided with a series of passages communicating with its interior, and arranged around it in a line at right angles to the axis thereof, and provided with properly-adjusted valves, which, by being brought in contact with suitable stops, as the carrier revolves, are successively opened, and the seed is thereby allowed to drop into the drill, the valve being closed by a spring as it passes such stop, said stops being adjustable, whereby to regulate both the extent and frequency of opening such valves, and by the peculiar form of the seed passages or ports to regulate the quantity dropped.

Figure 1 is a top or plan view of a seed-planter having my improvements applied thereto. Fig. 2 is a side elevation of Fig. 1. Fig. 3 is an inverted or under-side view of Fig. 1. Fig. 4 is an enlarged detached sectional view of the rotary seed-carrier, taken longitudinally through the same and through one of the seed-passages therein, and showing the valve, also in section. Fig. 5 is an enlarged detached plan view of the seed-carrier, showing one of the seed-passages and its valve as opened by the actuating device. Fig. 6 is a detached view of a modified means of transmitting the rotary motion of the pilot-wheel to the seed-carrier.

In the drawing, *a a* represent the sides of the frame, which terminate in the usual handles *b b*. *c c* are cross-bars, which unite the sides *a a*. This frame may be of any principle of construction, and it constitutes no part of my invention.

*d* is the pilot-wheel, which is rigidly secured to axle *e*, which latter revolves in bearings in sides *a a*. *g* is the seed-carrier, which is rigidly secured upon shaft *s*, which latter revolves in bearings in sides *a a*.

To insure the rotation of shaft *s* and carrier *g*, a fixed pulley, *h*, is secured upon shaft *e*, and a loose pulley, *i*, is placed upon shaft *s*. The clutch *l*, also on shaft *s*, is arranged to be adjusted thereon, and its rotation therewith is insured by the feather *m*, which is secured in the shaft and fits a corresponding slot in the clutch. The contact of the clutch with the pulley is effected by the pin *o* secured in the pulley, and the dog *n*, secured in the clutch. Belt *j* serves to transmit the rotary motion of pulley *h* to pulley *i*, which latter acts as an idler when not in contact with clutch *l*, as described; but when so in contact, then the shaft *s* is rotated, and therewith carrier *g*.

The clutch *l* may be brought in contact with pulley *i* by hand, or any shipping device may be connected therewith. By thus constituting pulley *i* either "fast" or "loose," as desired, the machine may be impelled to any desired distance without actuating the seed-dropper, and when in position for seeding, by connecting the clutch with pulley *i*, the seeding mechanism is rendered operative.

In Fig. 6, a machine-chain and sprocket gears are shown as a modification or equivalent for pulleys *h i* and belt *j;* but this method of imparting a rotary movement to the seed-carrier is not of the essence of my invention, but is shown as one of the various means of rendering the essential features of the invention operative.

The seed-carrier *g* is formed hollow, and preferably cylindrical, as shown. It may be formed of wood, like a cask, or of metal, as preferred. It is provided with a series of openings or seed-ports, *p*, arranged around the periphery in a line at right angles to its axis, as shown. These openings are at a distance from each other equal to the greatest distance apart that any kind of seeds will need to be dropped. To each of these openings is arranged a valve, $f$, pivoted at $t$, and arranged to fit closely over the hole and upon the valve-seat $r$.

To actuate these valves, the stops $w$ $w$ $w$ are threaded in the depending member $v$, as shown, and are adjustable endwise, so that all, or any number of them, may be turned back so as not to actuate the valves, if desired, and by reason of such end adjustment and the oblique ends of the valve-levers any desired degree of opening of the seed-ports may be insured, as the size or quantity of seeds to be dropped may require.

It will be apparent that if only one of the screws $w$ is so advanced as to act against the valve-stems or levers, then the seeds will be deposited in the drill or furrow at the same distance apart as are the holes $p$ in carrier $g$; but by advancing the two outside ones so as to act against the valve-stems, then the seeds would be deposited at distances equal to that between said screws, while if all three screws were so advanced, then the seed-spaces in the drill would equal the spaces between the several screws. A variety of devices may be employed to graduate the spaces between the seeds in the drill, while the distances between the seed-ports $p$ remain the same or are unchangeable, one method being to vary the relative speeds of shafts $e$ and $s$.

The hinged coverers $z$ serve to move the earth toward the drill after the seed is deposited, and the roll $b'$, pivoted in the hinged frame $a'$, serves to press the earth over the seed. Both these devices, being old and well-known, are shown as one of the many means of covering the seed after it is dropped. If desired, a colter or drill-opener may be employed just in rear of the pilot-wheel, as shown by dotted lines in Fig. 2; and the usual hopper for delivering the seed in the drill may be employed, as shown by dotted lines in said Fig. 2; but these devices constitute no part of my invention. In case a malformed seed or other substance larger than the seeds which were being dropped should catch in hole $p$, thereby holding the valve open, or partly so, I provide the stop $y$, mounted in member $x$, and so adjusted by its screw-thread connection in $x$ that it will successively open the valves as they pass it, as is shown in Fig. 1, thereby allowing any object which had been so caught by the valve to drop back into the cylinder, and thereby free the valve; and although such clogging can only occur at rare intervals, yet the opening of the valves at the highest point in each revolution insures the closing of the ports $p$ before the valve is in contact with stops $w$. It will be obvious that two or any desired number of rows of ports, $p$, may be provided in seed-carrier $g$, so as to seed two or more drills at the same time, without departing from the spirit of my invention.

The constant rolling motion of the seed inside the carrier tends to prevent the clogging of the passages or ports $p$ by the seed.

By forming the ends of the valve levers or stems oblique to their axis, as shown, and by the proper adjustment of the stops $w$ and stop $y$, any desired degree of motion of the valve may be insured as the size of the seeds being planted may require; and by forming the passages $p$ circular in one half their circumference and elliptic in the other half, as shown in Fig. 5, and by the proper movement of the valves, one or more small seeds only may be emitted, or very large seeds may be allowed to escape.

I claim as my invention—

1. In a seed planter provided with the rotary seed-carrier, having seed-passages in its circumferential wall and valves to close and open such passages, with stops $w$ to open such valves when at or near the lowest point described in the circuit of the seed-carrier, the stop $y$, combined and arranged to open such valves when at or near the apex of the circuit of the carrier, to release any substance which might be caught by such valve in the seed-passage, substantially as described and shown.

2. In a seeder provided with a rotary seed-carrier, having the seed-passages and the valves $f$, the stops $w$, constructed and arranged to admit of both an adjustment to insure a greater or less opening of the seed-passages and a greater or less frequency of such opening, substantially as described and shown.

3. In a rotary seed-carrier, the seed-passages $p$, formed at the point where first unmasked by valves $f$ as a semi-ellipse, or nearly so, substantially as and for the purposes specified.

WILLIAM K. EVANS.

Witnesses:
JAMES H. DEAN,
THOMAS DOLE.